United States Patent
Patton et al.

(10) Patent No.: US 11,558,258 B1
(45) Date of Patent: Jan. 17, 2023

(54) METHODS AND APPARATUSES FOR IDENTIFYING CHARACTERISTICS OF USERS OF ELECTRONIC RESOURCES

(71) Applicant: Walmart Apollo, LLC, Bentonville, AR (US)

(72) Inventors: Kyle Thomas Patton, Pea Ridge, AR (US); Trimurtulu Kukkala, Andhra Pradesh (IN); Seetha Ramaiah Munnangi, Union City, CA (US); Rajnikant RamakantSingh Sharma, Cupertino, CA (US); Sanjay Kumaran Patel, Karnataka (IN); Amit Kumar, Karnataka (IN); Jeremy Grant, Bentonville, AR (US); Gnanasekar Velu, Fremont, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/589,750

(22) Filed: Jan. 31, 2022

(51) Int. Cl.
| | |
|---|---|
| *G06F 15/173* | (2006.01) |
| *H04L 41/0896* | (2022.01) |
| *H04L 43/06* | (2022.01) |
| *H04L 43/02* | (2022.01) |
| *H04L 43/16* | (2022.01) |

(52) U.S. Cl.
CPC .......... *H04L 41/0896* (2013.01); *H04L 43/06* (2013.01); *H04L 43/02* (2013.01); *H04L 43/16* (2013.01)

(58) Field of Classification Search
CPC ...... H04L 43/16; H04L 43/02; H04L 41/0896
USPC ........................................................ 709/224
See application file for complete search history.

(56) References Cited

U.S. PATENT DOCUMENTS

| | | | |
|---|---|---|---|
| 7,385,924 B1* | 6/2008 | Riddle | H04L 43/00 |
| | | | 370/252 |
| 8,127,353 B2 | 2/2012 | Rittermann | |
| 10,284,619 B2 | 5/2019 | Li et al. | |
| 11,470,144 B1* | 10/2022 | Maurya | H04L 43/08 |

(Continued)

FOREIGN PATENT DOCUMENTS

| | | |
|---|---|---|
| JP | 6904600 B2 | 7/2021 |
| WO | 2004046953 A1 | 6/2004 |

OTHER PUBLICATIONS

NetVizura—Network Monitoring Solutions, "NetVizura, NetVizura User Guide," 2016, 239 pages.

(Continued)

*Primary Examiner* — Hee Soo Kim
(74) *Attorney, Agent, or Firm* — Morgan, Lewis & Bockius LLP; Manita Rawat

(57) ABSTRACT

A system for determining ownership information for users of electronic resources includes at least one computing device configured to receive a trigger request and obtain first resource usage data and first resource identity data from a first resource provider using a first resource collection engine. The system also is configured to obtain second resource usage data and second resource identity data from a second resource provider using a second resource collection engine. The system is also configured to select one or more users of interest based on the first resource usage data, the first resource identity data, the second resource usage data and the second resource identity data and to determine ownership of the selected one or more users of interest.

20 Claims, 6 Drawing Sheets

(56) References Cited

U.S. PATENT DOCUMENTS

| | | | |
|---|---|---|---|
| 2015/0358391 A1* | 12/2015 | Moon | H04L 67/10 |
| | | | 709/224 |
| 2017/0223117 A1* | 8/2017 | Messerli | H04L 47/783 |
| 2022/0027431 A1* | 1/2022 | Zheng | H04L 67/125 |

OTHER PUBLICATIONS

Cisco, "NetFlow Configuration Guide, Cisco IOS Release 15M &T," 2018, 155 pages.
Samuel Cheah, "Analzing Network Data Log," May 7, 2019, 14 pages.

* cited by examiner

METHODS AND APPARATUSES FOR IDENTIFYING CHARACTERISTICS OF USERS OF ELECTRONIC RESOURCES

TECHNICAL FIELD

The disclosure relates generally to methods and apparatuses for identifying characteristics of users of electronic resources. More particularly, the disclosure relates to methods and apparatuses for identifying characteristics of top bandwidth users.

BACKGROUND

Many organizations have the need for using multiple service providers for various electronic resources. One such electronic resource is access to and bandwidth for data or network communication. In many instances, multiple internal and external processes of organizations utilize a communication network or cloud services to share data, information and/or processing capacity with internal and external partners, customers and colleagues. The management of electronic resources such as that of communication networks and cloud services is important to the organization so as to minimize disruptions to business processes. Organizations may have contacts, agreements or existing hardware that caps or limits the amount of network traffic or other capacity that is allowed or that the systems can handle. Providers of electronic resources such as communication networks our cloud services can also impose increased costs for usage levels that exceed negotiated thresholds. It is important, therefore, for organizations to manage its electronic resources in order to minimize disruptions to its activities and to prevent increased costs for such services.

Traditional systems and methods of service providers and/or internal systems that organizations use to provide communication networks or cloud services may include limited information regarding usage. Such traditional systems often include information that is not useful for the organization or provides an enterprise-level view of usage and top users of electronic resources. There exists a need, therefore, for improved system, apparatuses and methods for managing electronic resources and for determining more detailed information regarding network or cloud service usage and top users. Such improved systems, apparatuses and methods can allow organizations to lower costs and minimize disruption.

SUMMARY

The embodiments described herein are directed to apparatuses and methods for determining characteristics of users of electronic resources. One characteristic that can be determined is the ownership of users of electronic resources. In some embodiments, one or more computing devices can obtain usage data and identity data from one or more different electronic resource service providers. This information may not include ownership information for the users so that events such as surges, disruptions, elevated usage levels of other events cannot be traced to the responsible parties. The apparatuses and methods of the present disclosure provide ownership information for the users so that the usage can be traced to a responsible party. The apparatuses and methods of the present disclosure can obtain such information from multiple different service providers and trace ownership. The apparatuses and methods provide a comprehensive and multi-threaded process that can obtain such ownership information and related resource usage for multiple sources or service providers.

In accordance with various embodiments, exemplary systems may be implemented in any suitable hardware or hardware and software, such as in any suitable computing device. For example, in some embodiments, a computing device is configured to receive a trigger request and to obtain first resource usage data and first resource identity data from a first resource provider using a first resource collection engine. The first resource usage data and corresponding first resource identity data characterizes users of a first resource. The computing device may also be configured to obtain second resource usage data and second resource identity data from a second resource provider using a second resource collection engine. The second resource usage data and corresponding second resource identity data characterizes users of a second resource. The computing device may also be configured to select one or more users of interest based on the first resource usage data, the first resource identity data, the second resource usage data and the second resource identity data, determine ownership of the selected one or more users of interest, and publish ownership of the selected one or more users of interest.

In one aspect, the trigger request is automatically generated when the first resource data or the second resource data indicates that usage of the first resource or the second resource is greater than a predetermined usage level.

In another aspect, the first resource collection engine is configured to obtain the first resource usage data and the first resource identity data from a first resource data manager and the second resource collection engine is configured to obtain the second resource usage data and the second resource identity data from a second resource data manager. The first resource data manager and the second resource data manager may be different.

In another aspect, the first resource is a first cloud services provider and the second resource is a second cloud services provider.

In another aspect, the first resource usage data includes bandwidth data describing an amount of bandwidth consumed by one or more users and the first resource identity data include an internet protocol (IP) address associated with the one or more users.

In another aspect, the first resource collection engine and the second resource collection engine do not obtain ownership data that characterizes an ownership related to IP addresses in the first resource identity data or in the second resource identity data.

In another aspect, the one or more users of interest are selected by sorting a usage of the first resource and the second resource for each user and selecting users with the greatest usage levels of the first resource and the second resource.

In some embodiments of the present disclosure, a method of determining ownership of users of an electronic resource is provided. The method may include receiving a trigger request and obtaining first resource usage data and first resource identity data from a first resource provider using a first resource collection engine. The first resource usage data and corresponding first resource identity data may characterize users of a first resource. The method may also include obtaining second resource usage data and second resource identity data from a second resource provider using a second resource collection engine. The second resource usage data and corresponding second resource identity data may characterize users of a second resource. The method may also include selecting one or more users of interest based on the first resource usage data, the first resource identity data, the second resource usage data and the second resource identity data, determining ownership of the selected one or more users of interest, and publishing ownership of the selected one or more users of interest.

In some embodiments, a non-transitory computer readable medium is provided. The non-transitory computer readable medium may have instructions stored thereon, wherein the instructions, when executed by at least one processor, cause a device to perform operations that include receiving a trigger request and obtaining first resource usage data and first resource identity data from a first resource provider using a first resource collection engine. The first resource usage data and corresponding first resource identity data may characterize users of a first resource. The operations may also include obtaining second resource usage data and second resource identity data from a second resource provider using a second resource collection engine. The second resource usage data and corresponding second resource identity data may characterize users of a second resource. The operations may also include selecting one or more users of interest based on the first resource usage data, the first resource identity data, the second resource usage data and the second resource identity data, determining ownership of the selected one or more users of interest, and publishing ownership of the selected one or more users of interest.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
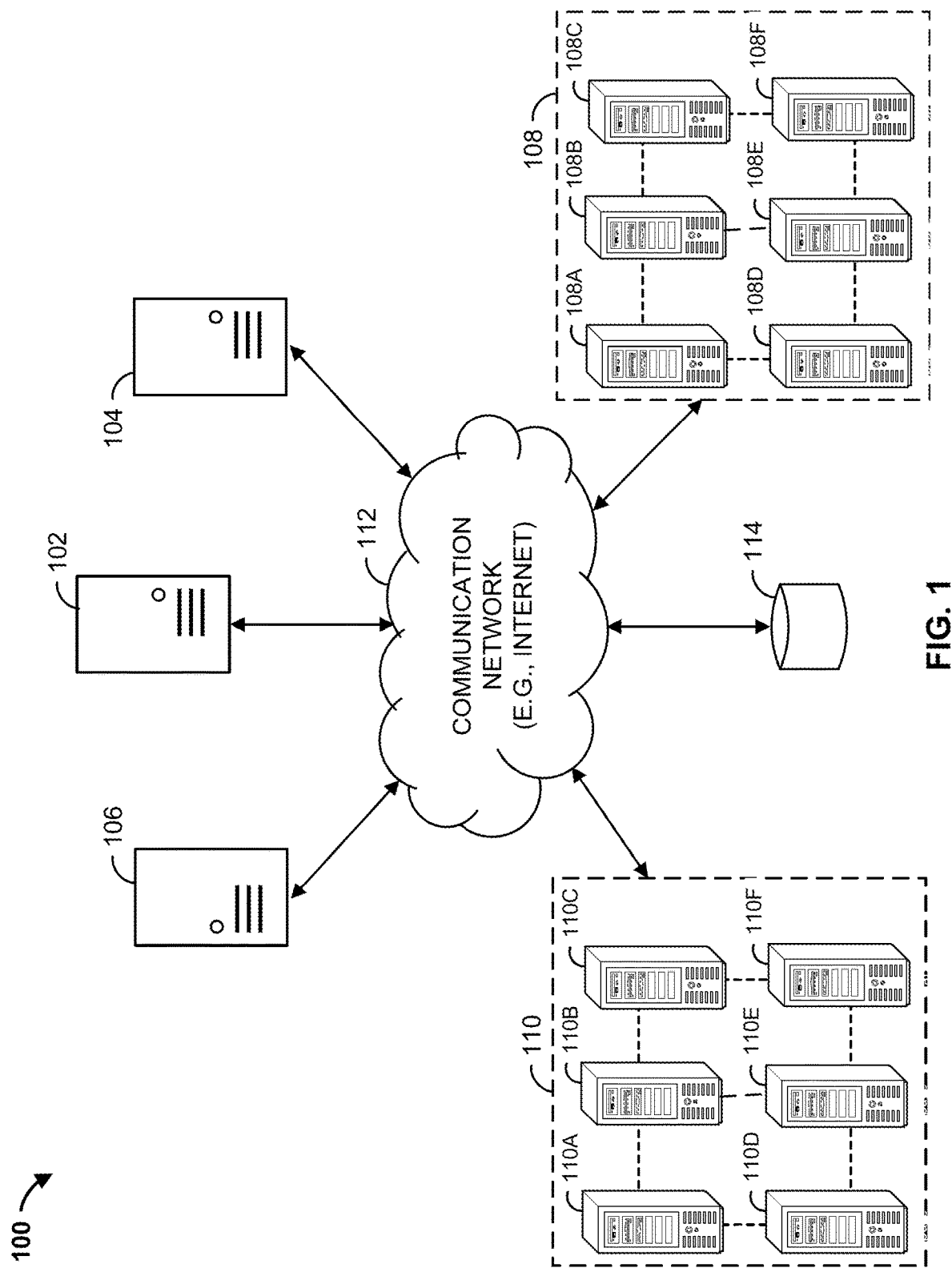
FIG. 1 is a block diagram of a resource user identification system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

As further explained below, the present disclosure is directed to apparatuses and methods for determining characteristics of users of electronic resources such as communication networks or cloud services. Many organizations, especially those with significant resource requirements, may have both internal hardware that provides cloud services as well as third-party service providers that provide cloud services. Such a practice not only diversifies the computing platforms for its operations but also may be necessary for organizations with significant computing needs. The organizations have limits on the capability that existing hardware can provide. In addition, the organizations likely negotiate costs related to predetermined computing requirements that are purchased from third-party service providers. When the organization's computing needs exceed those of the capacity of the hardware, the computing process may be disrupted by causing downtime, poor performance, or failure of systems. In addition, when the organization's computing needs increase, the organization will incur increased costs for the increased capacity. In some relationships with cloud service providers, the cost can significantly increase when the organization's usage exceeds thresholds determined or negotiated when contracts for such services are initiated.

In light of the environment described above, it may be important for the organization to understand the usage of the electronic resource so as to minimize business disruptions and to minimize cost increases. An organization, however, may have hundreds or thousands of individuals, departments, cost-centers, business units, locations, or the like that consume the electronic resource, such as cloud services. For purposes of the present disclosure, a user may be any identifiable entity that consumes the electronic resource such as an individual, department, cost-center, business unit, store, location, or the like. The organization may desire to understand the top users of its electronic resources or to understand the levels of usage for each user. With this information, the organization can address the needs of each user and weigh the cost of the usage of the resource against the value added by a particular user. In addition, when spikes in usage occur or when usage exceed certain thresholds, the organization may want to understand which users are causing, contributing or otherwise influencing the spikes, increases or surges in resource usage.

Problems exist, however, in existing apparatuses or methods of determining characteristics of users. In many existing methods, only limited information is available for a particular user of an electronic resource. This limited information may only include an identification number such as an internet protocol (IP) address for the user. This limited information may not provide the organization with enough information to identify the ownership of the user. The ownership information for the users may include information necessary to understand the role of a user in the organization and/or the particular activities that the user is responsible for. The ownership information may include, for example, the name, address, location or other identifying information. This ownership information can then be used by the organization to determine remedial actions and/or conduct other analyses to determine actions to address the disruptions to services, spikes in electronic resource usage, surges in electronic resource usage, or other disruptive events.

In addition to providing only limited information, existing systems and methods cannot be accessed or used using a single information gathering process or tool. The third-party service providers often provide information using their own proprietary or unique information tools. Because of the multiple information sources and tools, the organization must aggregate the information from the multiple sources and/or multiple third-party service providers. The organization must also then use the limited information that is available from the third-party service providers to then determine the ownership information for the users.

The apparatuses and methods of the present disclosure are improvements over existing or traditional methods. The apparatuses and methods of the present disclosure can automatically interface with the multiple third-party service provider information sources and/or with the internal service provider sources to collect information regarding users of the electronic resource. The apparatuses and methods of the present disclosure can also automatically determine ownership information for the users that are obtained from the third-party service provider tools or from the internal resources. The user and ownership information can then be published for use by the organization. The apparatuses and methods of the present disclosure are improvements over existing or traditional methods because the apparatuses and methods of the present disclosure can quickly obtain information from various third-party service providers or from internal resources. The apparatuses and methods can also then determine ownership information from the user information. The centralized and automatic apparatuses and methods of the present disclosure allows the organization to determine ownership of the users that cause, contribute or are related to various spikes, surges, elevated levels or other events for the various sources of electronic resources.

The apparatuses and methods of the present disclosure can be used in various industries or by various organizations. Organizations such as large retailers, for example, can use and implement the apparatuses and methods of the present disclosure. It should be appreciated, however, that aspects and examples of the present disclosure can be used in other contexts, industries and environments as well.

Turning to the drawings, FIG. 1 illustrates a block diagram of a resource user identification system 100 that includes a user identifier computing device 102 (e.g., a server, such as an application server), a resource information server 104 (e.g., a web server), a second resource information server 106, a first resource 108 (e.g., a first cloud service), a second resource 110 (e.g., a second cloud service), and database 114 operatively coupled over network 112. User identifier computing device 102, resource information server 104, second resource information server 106, workstation(s) 108 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 112.

In some examples, user identifier computing device 102 can be a computer, a workstation, a laptop, a server such as a cloud-based server, or any other suitable device. In some examples, user identifier computing device 102 may be operated by a large organization that requires several sources for electronic resources. For example, the organization may require multiple cloud service providers. The first resource 108 and the second resource 110 can be such service providers. For example, the first resource 108 may include multiple servers 108A to 108F. The servers 108A to 108F may provide any suitable electronic resource, such as cloud services. The second resource 110, similarly, may include multiple servers 110A to 110F to provide any suitable electronic resource, such as cloud services. In some examples, the first resource 108 and/or the second resource 110 may be operated from a third-party service provider. In other examples, the first resource 108 and/or the second resource 110 may be operated by an internal information services department of the organization that operates the user identifier computing device 102. The resource user identification system 100 shown in FIG. 1 includes two resources 108 and 110. In other examples, the resource user identification system 100 may include more than two resources 108 and 110. 102

The user identifier computing device 102 is operable to communicate with the resource information server 104, the second resource information server 106, the first resource 108, the second resource 110, and the database 114 over communication network 112. For example, user identifier computing device 102 can store data to, and read data from, database 114. Database 114 can be a remote storage device, such as a cloud-based server, a memory device on another application server, a networked computer, or any other suitable remote storage. Although shown remote to user identifier computing device 102, in some examples, database 114 can be a local storage device, such as a hard drive, a non-volatile memory, or a USB stick.

Communication network 112 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 112 can provide access to, for example, the Internet.

Figure 2:
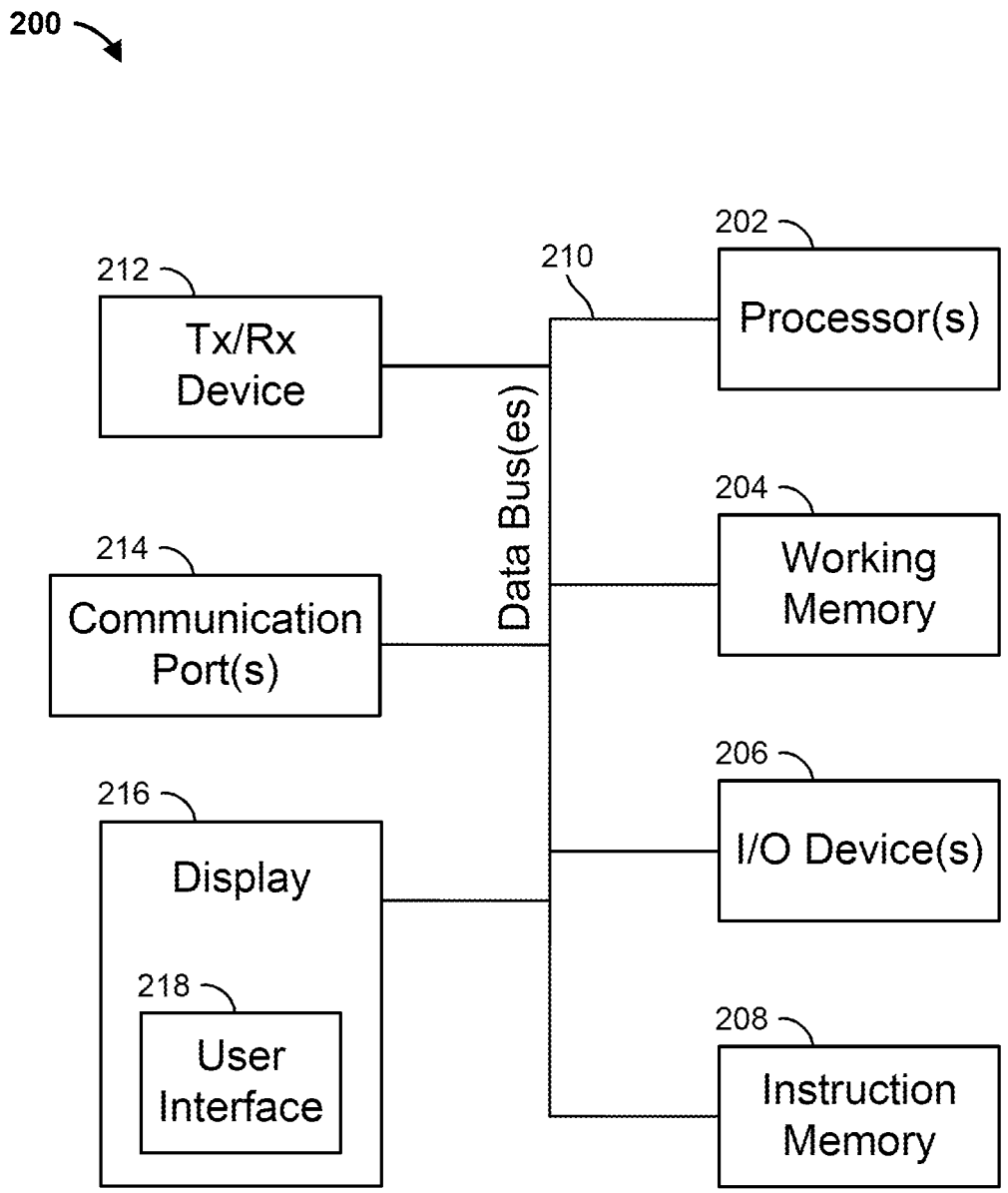
FIG. 2 is a block diagram of an example user identifier computing device in accordance with some embodiments.

FIG. 2 illustrates an example computing device 200. The user identifier computing device 102, the resource information server 104, the second resource information server 106, the first resource 108 (or elements thereof) and/or the second resource 110 (or elements thereof) may include the features shown in FIG. 2. For the sake of brevity, FIG. 2 is described relative to the user identifier computing device 102. It should be appreciated, however, that the elements described can be included, as applicable, in the resource information server 104, the second resource information server 106, the first resource 108 (or elements thereof) and/or the second resource 110 (or elements thereof).

As shown, the user identifier computing device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of user identifier computing device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as store layout data, product data, forecast data, demand transference data and/or product replenishment data.

Display 216 can display a user interface 218. User interfaces 218 can enable user interaction with the user identifier computing device 102. For example, user interface 218 can be a user interface that allows an operator to interact, communicate, control and/or modify different messages, settings, or features that may be presented or otherwise displayed to an operator. In some examples, an operator can interact with user interface 218 by engaging input-output devices 206. In some examples, display 216 can be a touchscreen, where user interface 218 is displayed on the touchscreen. In other examples, display 216 can be a computer display that can be interacted with using a mouse or keyboard.

Transceiver 212 allows for communication with a network, such as the communication network 112 of FIG. 1. For example, if communication network 112 of FIG. 1 is a wireless network, transceiver 212 is configured to allow communications with the wireless network. In some examples, transceiver 212 is selected based on the type of communication network 112 user identifier computing device 102 will be operating in. Processor(s) 202 is operable to receive data from, or send data to, a network, such as communication network 112 of FIG. 1, via transceiver 212.

Figure 3:
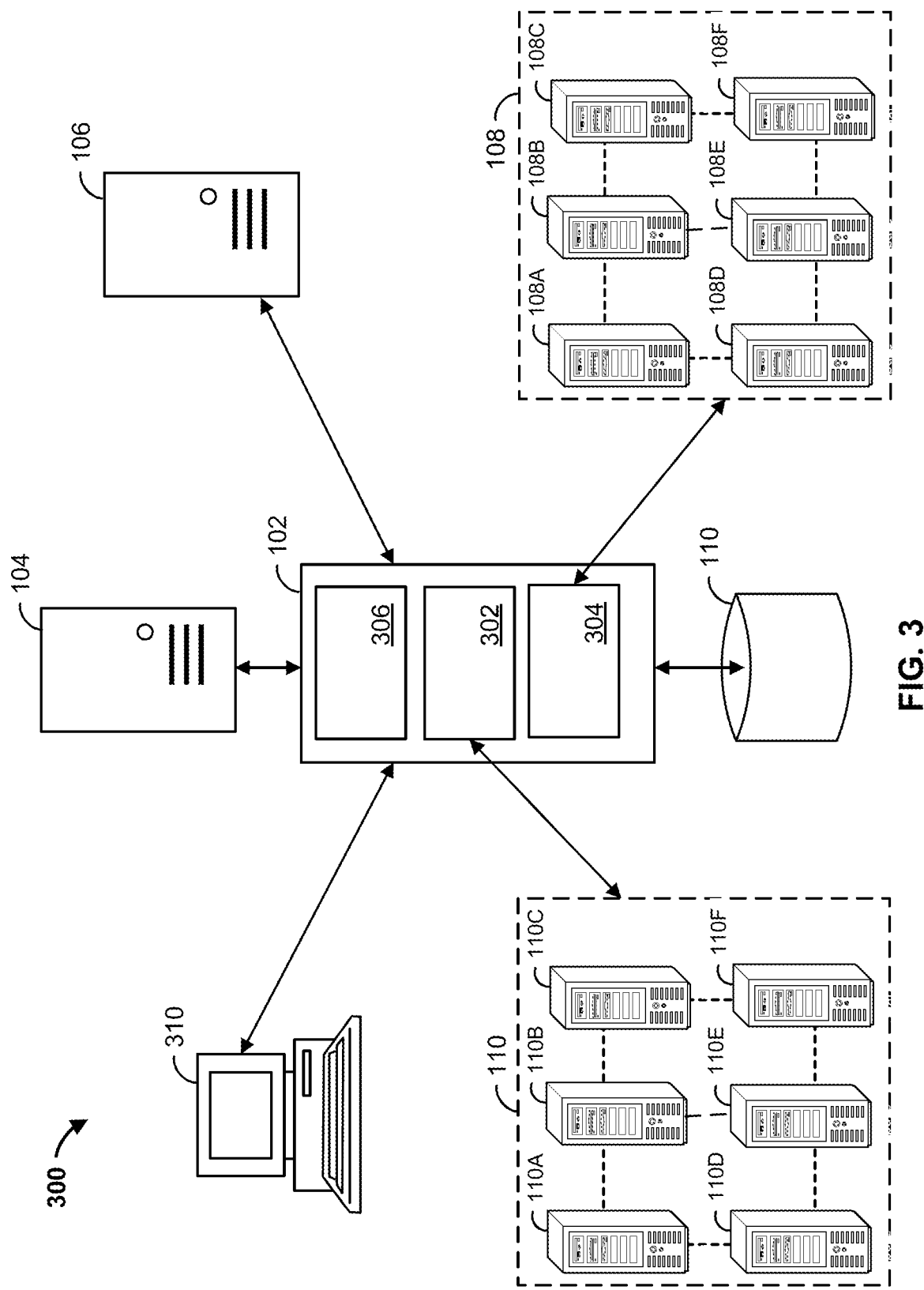
FIG. 3 is a block diagram of aspects of the resource user identification system of FIG. 1 in accordance with some embodiments.

Turning now to FIG. 3, another example resource user identification system 300 is shown. The resource user identification system 300 can be similar to the resource user identification system 100 previously described. While not shown, the various elements of the resource user identification system 300 can be connected via a communication network such as network 112. In other examples, one or more of the elements of the resource user identification system 300 can alternatively be connected via wired or local connections.

As shown, the resource user identification system 300 includes user identifier computing device 102, resource information server 104, second resource information server 106, first resource 108, second resource 110, workstation 310 and database 114. The user identifier computing device 102 is operable to communicate with and exchange information with each of resource information server 104, second resource information server 106, first resource 108, second resource 110, workstation 310 and database 114.

The user identifier computing device 102 can, in the example shown, include a first resource collection engine 302 and a second resource collection engine 304. The first resource collection engine 302 can operate to communicate with first resource 108 to obtain first resource usage data and first resource identity data. Similarly, the second resource collection engine 304 can operate to communicate with second resource 110 to obtain second resource usage data and second resource identity data. Since, the first resource 108 and the second resource 110 may be operated by different entities such as different third-party service providers. The first resource collection engine 302 and the second resource collection engine 304 can include different application protocol interfaces (APIs) and/or different scripts or code to communicate and collect the usage data and the resource identity data.

For example, the first resource 108 can be operated by a first service provider and the second resource 110 can be operated by a second service provider. The first resource collection engine 302 can be configured to obtain first resource usage data and first resource identity data from the first resource 108. The first resource 108 may operate, in some examples, a flow log or other dashboard or information usage tool that can be accessed by customers. The first resource collection engine 302 can be configured to obtain the first resource usage data and first resource identity data from the flow log, dashboard or other usage tool. The second resource 110, since it is operated by a second service operator, includes a different flow log, dashboard or other information usage tool than the one operated by the first service provider. Therefore, the second resource collection engine 304 is configured differently from the first resource collection engine 302. The second resource collection engine 304 performs a similar function, however, in that it obtains second resource usage data and second resource identity data.

The first (or second) resource usage data can include information to describe a usage level of the first (or second) resource by each of the users that are using the resource. The resource usage data can describe, for example, a bandwidth being used by the user over time. The resource usage data can describe a bandwidth usage of a cloud service in some examples. The resource identity data can be coupled with the resource usage data to describe an identity of the user associated with a usage level. The resource identity data, however, includes limited information to identify the user.

The organization that is using the first or second resource is unable to identify an ownership of the user in order to understand the owner of the usage level. For this reason, further steps are required internal to the organization to identify the ownership of the user and the of the usage level. In some examples, the resource identity data may include an internet protocol (IP) address of the user. The paired resource usage data and the resource identity data may provide the usage level and the IP address at a particular time. This information cannot be actioned by the organization, however, because the organization does not know the ownership of the IP address. Thus, the organization does not know which individual, department, business-unit, etc. is responsible for the usage of the electronic resource after the first or second resource collection engine 302, 304 obtains the resource usage data and the resource identity data.

The user identifier computing device 102 may also include ownership engine 306 that can operate to determine ownership of the user(s) that may be included in the resource usage data and the resource identity data. The ownership engine 306 can obtain or access data tables or databases that may be used to determine ownership of a user that is obtained from the first resource 108 and/or the second resource 110. The ownership engine 306 can search, query, compare or otherwise correlate the resource identity data with information that may be obtained by the ownership engine 306. The ownership engine 306 may access and/or obtain ownership data from resource information server 104, second resource information server 106 and/or from database 114. This information may include IP addresses and corresponding ownership data. The ownership data may be maintained and/or stored in the resource information server 104, the second resource information server 106 and/or the database 114 by an information services or other operations department of the organization, for example. This information that is maintained internally can be compared against the resource identity data to determine the ownership of the IP addresses (or other identifying information).

Figure 4:
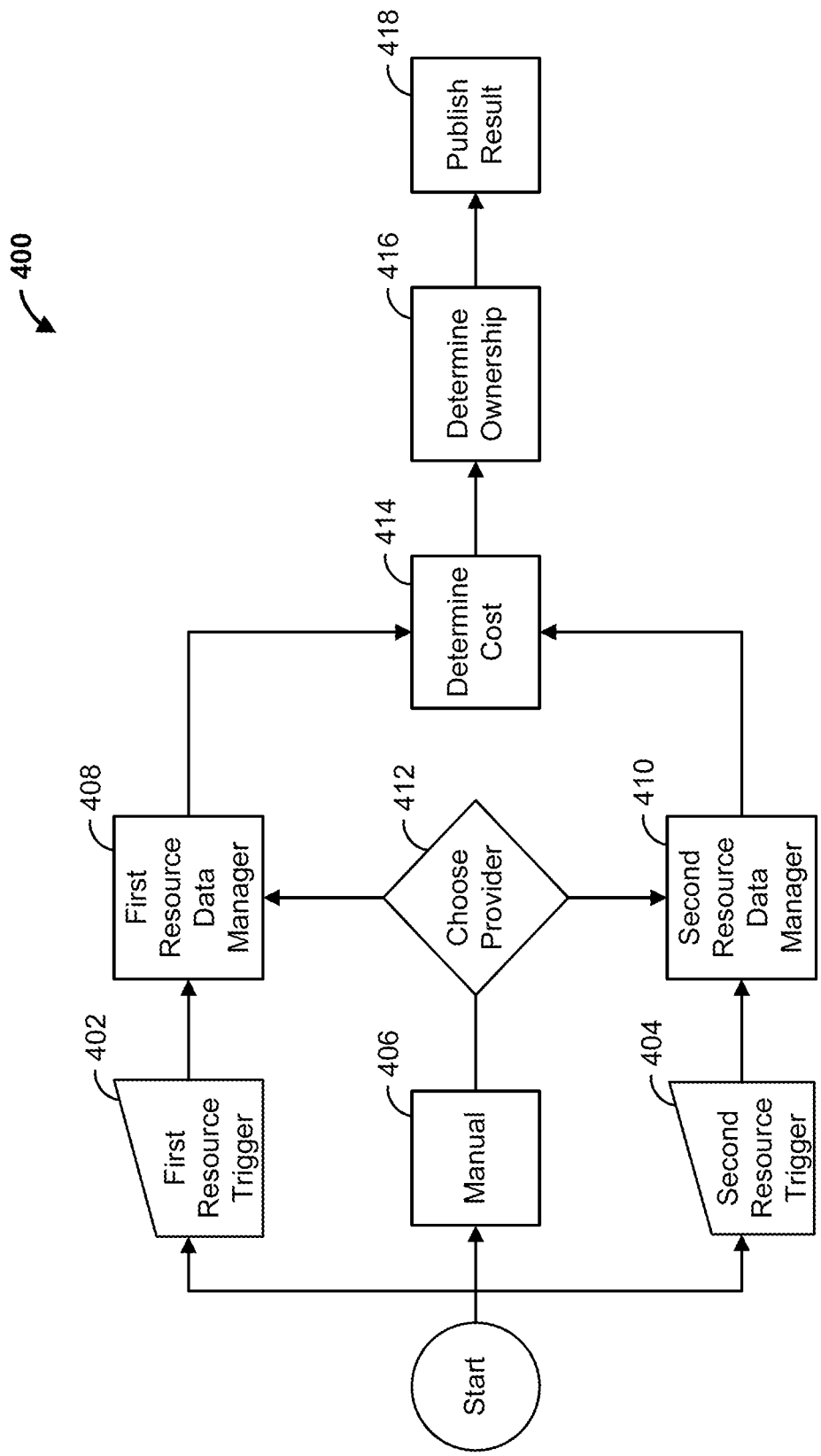
FIG. 4 is a flow chart illustrating an example method of determining ownership of users of electronic resources in accordance with some embodiments.

Referring now to FIG. 4, a method 400 of determining usage levels and ownership for electronic resources is shown. The method 400 can begin with either step 402, step 404, or step 406. In one alternative, the method starts with step 406. At step 406, the method can be initiated manually by an operator of the organization that desires to know more information about usage of its electronic resources. For purposes of the description of method 400, electronic resources such as cloud services are described. It should be appreciated, however, that the method 400 and aspects thereof can be applied to other electronic resources as may be applicable.

At step 406, an operator can initiate a manual determination of usage of an electronic resource. The operator may initiate the process using a workstation 310 (FIG. 3), for example. The operator may desire to obtain usage information on a periodic basis or may observe an event such as a surge, disruption or spike in usage. This may prompt the user to manually initiate the process 400. In some examples, a dashboard or usage tool may be provided to the operator on his/her workstation 310 that allows the operator to initiate the process 400. In other examples, the method 400 can be initiated using any suitable user interface, button, command or the like. If the manual initiation is used, the method 400 may proceed to step 412 at which the operator can choose a provider. At step 412, the operator can choose which service provider of the electronic resource should be accessed to determine usage levels. For example, the operator can choose to obtain usage information for a first resource provider or for a second resource provider. Any suitable selector can be used to choose the provider at step 412, such as by using the same tool, command, button or user interface used at step 406. If the operator selects the first resource provider, the method proceeds to step 408. If the operator selects the second resource provider, the method proceeds to step 410.

Alternatively, the method 400 may be initiated at step 402 or step 404. At step 402, the method 400 can be initiated by a first resource trigger. The first resource trigger can be, for example, a predetermined threshold, event, rule, usage level, spike or surge in usage. When such an event occurs or when a threshold is met, the first resource trigger can be sent to the user identifier computing device 102 to initiate the method 400. The first resource trigger, in other examples, can be sent to or received by the user identifier computing device 102 after a predetermined amount of time such as on a periodic basis like daily, weekly, monthly, etc. After the first resource trigger, the method 400 moves to step 408.

In another path of method 400, the second resource trigger 404 may initiate the method. The second resource trigger 404 may be the same or similar to the first resource trigger 402 previously described. The second resource trigger 404 may initiate the method with respect to different service provider. As can be appreciated, the first resource trigger can initiate the method to determine resource usage for a first resource and the second resource trigger can initiate the method 400 to determine resource usage for a second resource.

At step 408, the user identifier computing device 102 can obtain resource usage data and resource identity data from a first resource data manager. The first resource data manager can be, for example, a flow log, dashboard or other tool operated by the service provider to supply data regarding usage levels and user IP addresses. The first resource collection engine 302 may, for example, obtain the first resource identity data and the first resource usage data at step 408.

At step 410, the user identifier computing device 102 can obtain resource usage data and resource identity data from a second resource data manager. The second resource data manager can be similar to the first resource data manager and can be, for example, a flow log, dashboard or other tool operated by a second service provider to supply data regarding usage levels and user IP addresses. The second resource collection engine 304 may, for example, obtain the second resource identity data and the second resource usage data at step 410. After step 408 or step 410, the method 400 can proceed to step 414.

At step 414, the user identifier computing device 102 may determine a cost of the usage. The user identifier computing device 102 may determine a cost associated with the usages that are described in the resource usage data that was obtained at steps 408 or step 410. The user identifier computing device 102 may, for example, access pricing information from the organization's electronic resource contracts. Such pricing information can be obtained, for example, from the resource information server 104, the second resource information server 106 and/or the database 114. In still other examples, the pricing information can be obtained from other sources. The user identifier computing device 102 may determine the cost associated with the usages of the resource so that such information can be used to determine future actions that may be taken by the organization such as negotiating different rates for the resources or for allocating enterprise level costs of the electronic resource to the owners of the usage.

The method 400 may continue to step 416. At step 416, the user identifier computing device 102 may determine ownership 416. As discussed above, the information available from the service providers that is obtained from the first resource data manager or the second resource data manager at steps 408 or step 410, respectively, may include limited information regarding the individual, department, business-unit or other user. At step 416, the user identifier computing device 102 may determine more detailed information regarding the responsible party for the resource usage. Any suitable process can be used to determine ownership. In one example, the user identifier computing device 102 can perform the method 500 described below. In other examples, other searches, data mining, application to machine learning models or like can be used to determine ownership.

The method 400 may continue to step 418. At step 418, the results of the ownership determination may be published. In addition, the levels of resource usage and the time and date of such usage may provided. In other examples, other information or formats for such information can be used. In another example, the top resources are published that list the top X users with the ownership and usage level, where X equals a predetermined number of users that can be selected by the operator. In yet other examples, a listing that provides information for owners that exceed a predetermined usage level are published. Any suitable method of publishing can be used, such as, for example, displaying this information via a graphical user interface, dashboard or the like. The results can also be stored, such as in database 114.

Figure 5:
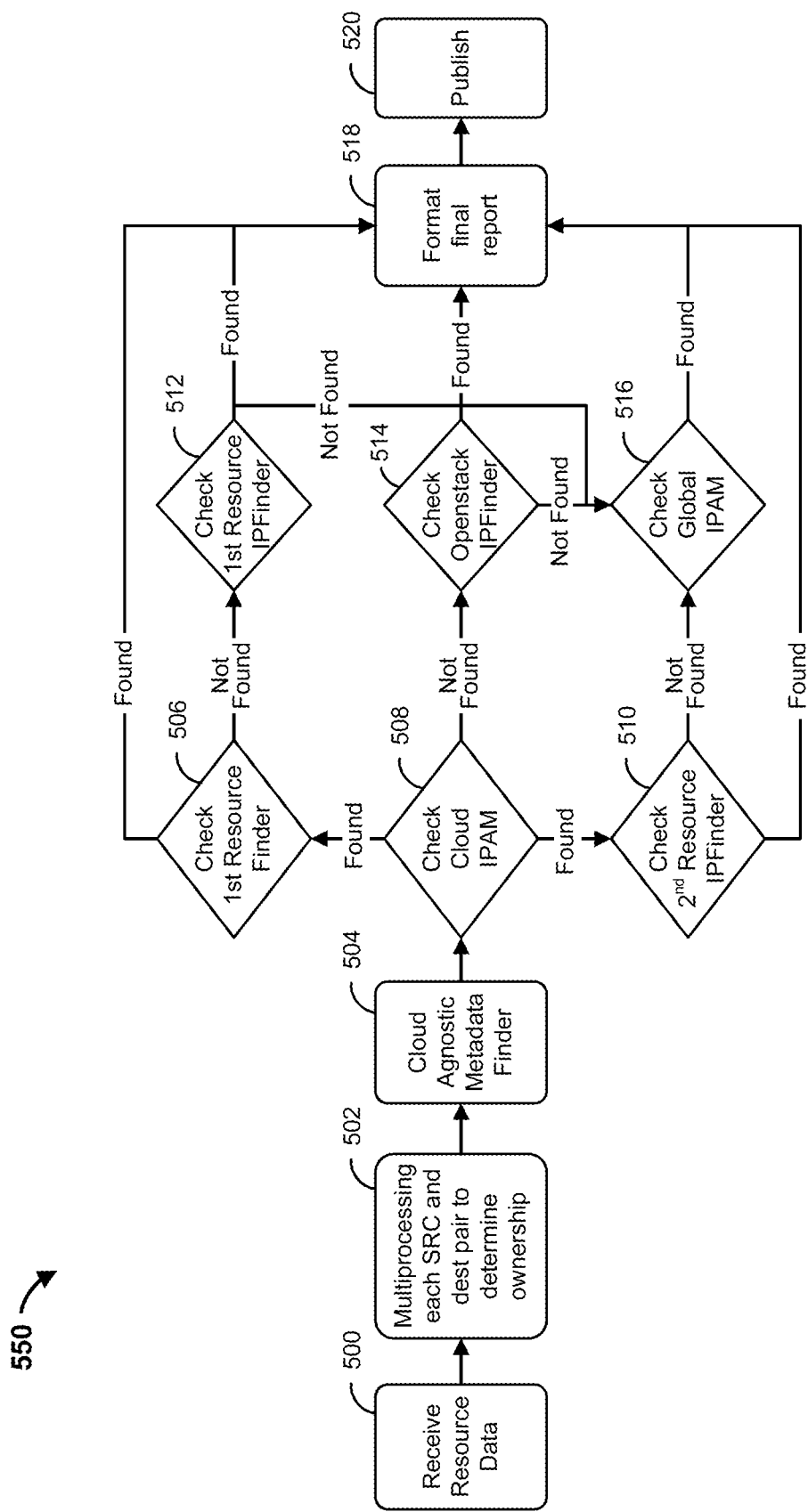
FIG. 5 is a flow chart illustrating an example method of searching for ownership information in accordance with some embodiments.

Referring now to FIG. 5, an example method 550 of determining ownership for usage of an electronic resource is shown. The method may be performed for example by the ownership engine 306 previously described. In other examples, other models, engines, systems or computing devices can be used. The method 550 may begin at step 500 at which the user identifier computing device 102 may receive resource data. The resource data may include the resource usage data and the resource identity data. The data may be obtained by the first resource collection engine 302 and/or the second resource collection engine 304. The resource data may include for example system resource controller (SRC) information and corresponding destination information. This information can analyzed at step 502 to determine ownership of the usage of the electronic resource. In one example, the identifier computing device 102 may query a Resource Data Manager and a predetermined number of user source and destination IP pairs can be obtained. This information can also include a number of bytes (or other usage data) that is consumed by the pair. Since this information may be from any resource (e.g., a first, second, third or other resource), the user identifier computing device can perform multi-processing using the steps at 504 and thereafter to determine ownership for each pair.

At step 508, the user identifier computing device 102 may compare the information in the resource data to information in a cloud agnostic internet protocol account manager (IPAM) database. The IPAM database may, for example, assign IP addresses to various electronic resource providers that are using the electronic resources. This information may be stored periodically, for example. If the user identifier computing device matches the resource data to a service provider, the method moves to the path corresponding to the corresponding service provider. For example, if the user identifier computing device 102 determines that the IP address or SRC, destination pair was assigned to the first resource, the method 550 proceeds to step 506. If the user identifier computing device 102 determines that the IP address or SRC, destination pair was assigned to the second resource, the method 550 proceeds to step 510. If the user identifier computing device 102 cannot find or does not match the resource information to a service provider, the method 550 proceeds to step 514. At step 514, the resource data is compared to information in an Openstack IPFinder. The Openstack IPFinder is another service provider agnostic information tool or source that includes IP addresses or SRC, destination pairs and corresponding ownership information. If the user identifier computing device 102 finds a match at step 514, the method proceeds to step 518. If a match is not found, the method proceeds to step 516.

At step 506, the resource data can be compared to information in a first resource finder. The first resource finder may be, for example, a search tool that includes information stored and/or maintained by an information services or operations group that manages the first resource service provider. If a match is found, the method proceeds to step 518. If a match is not found when the first resource finder is searched, the method moves to step 512. At step 512, the user identifier computing device 102 may compare the resource data to information in the first resource IPFinder. The first resource IPFinder may be a list of IP addresses that are assigned or allocated to various owners. This database may be maintained or stored by another entity other than the first resource finder or alternatively may be maintained or stored by another party. If the IP address is found, the process moves to step 518. If the IP address is not found the method moves to step 516.

At step 516, the user identifier computing device 102 may search and/or compare the resource data to a global IPAM database. The global IPAM database may include, for example, all IPs for the entire organization with corresponding ownership information. As can be appreciated, the global IPAM database may require more resources and/or time to search than the other data sources in the previously described steps. For this reason, the global IPAM is not accessed or searched unless other searches are unsuccessful in finding the ownership information that corresponds to the resource data.

When the method 550 proceeds from step 508 to step 510, the user identifier computing device 102 determined that the resource data corresponds to a second resource service provider. Thus, the method proceeds to step 510 in which the second resource IPFinder is accessed and searched for ownership information that matches the resource data. The second resource IPFinder can be similar to the first resource IPFinder accessed at step 512. The second resource IPFinder may be a database or tool maintained and/or stored that contains IP addresses or other identifying information with corresponding ownership information. If the user identifier computing device 102 matches the resource data and finds the ownership information, the method proceeds to step 518. If not, the method proceeds to step 516 and the user identification computing device performs step 516 as previously described.

At step 518, the resource data and corresponding ownership information that was uncovered during the search and/or comparing steps previously described can be formatted into a final report. The final report can be displayed or presented to the operator in any suitable format including those formats previously described. At step 520, the report can be published to the operator. The report can be published via a graphical user interface and/or via a dashboard or other tool. The results can also be stored in a database, such as in database 114.

As can be seen, the method 550 uses multiple finders or databases to find the ownership information associated with the resource data that is obtained from the resource service providers. The method 550 attempts to find such ownership information in sources of increasing complexity and/or in sources of increasing size. The method 550 attempts to find the ownership information in less complex or smaller sources because such a process allows multiple searches to be performed at the same time and requires less processing power/speed to perform. As such, the method 550 can be more quickly performed than if every user and/or resource data entry were searched against the global IPAM (see step 516) without first attempting to find the ownership information in the other resources.

The method 550 is a cloud agnostic process in that the method can be performed for any electronic resource regardless of service provider. In this manner, the method 550 can be performed for any data received from the various service providers that an organization may use for an electronic resource. The method 550 includes steps that are directed to a circumstance in which there are two service provides that each provide either the first resource or the second resource. The method 550 can be applied to instances in which an organization uses more than two service providers or uses multiple service providers in combination with multiple internal service providers. Furthermore, the method 550 is a multi-threaded process that may allow for multiple searches to being run various resource data such as for each SRC, destination pair.

Figure 6:
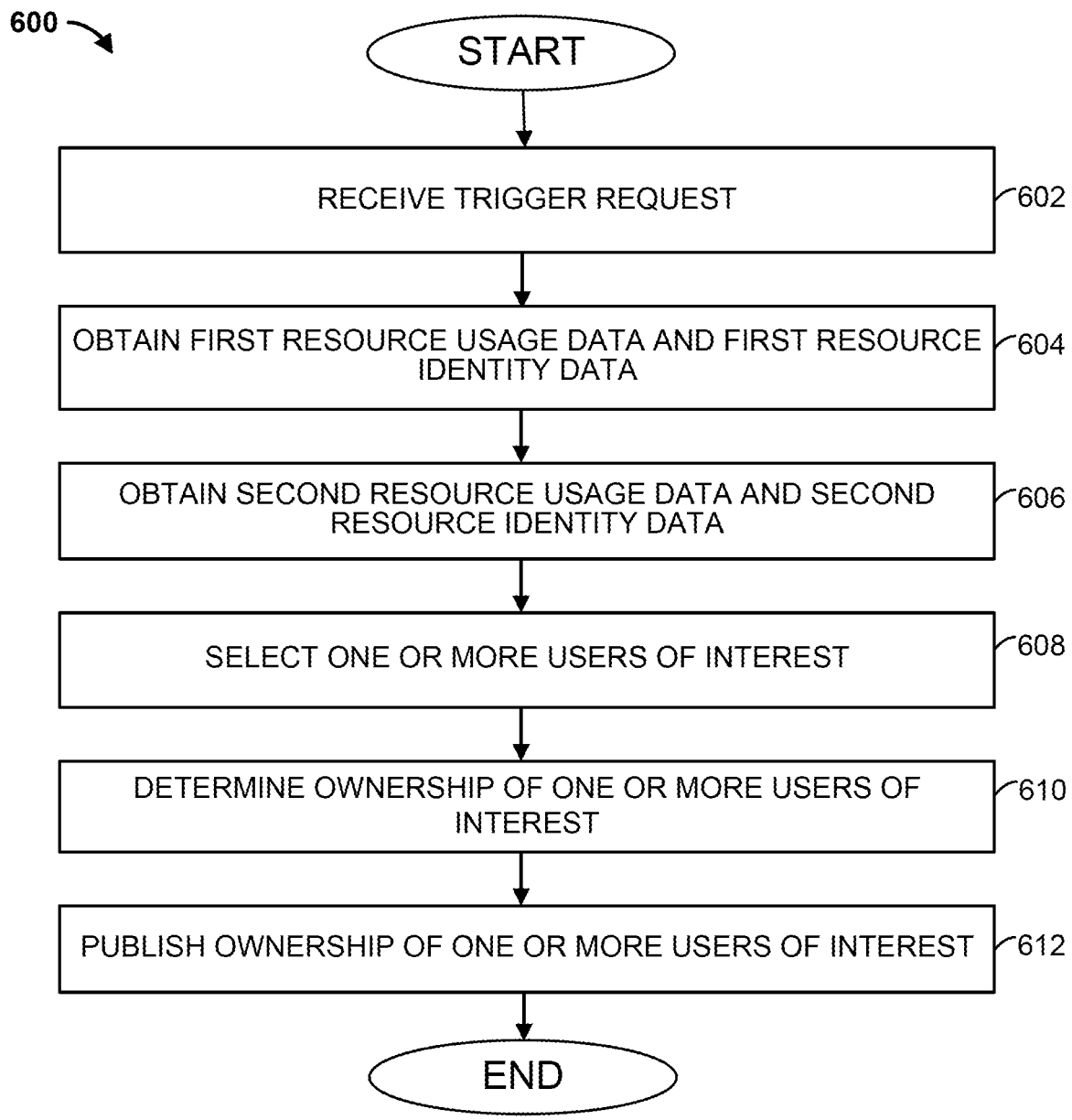
FIG. 6 is a flow chart illustrating an example method of determining ownership of top users of multiple electronic resources in accordance with some embodiments.

Referring now to FIG. 6, an example method 600 of determining ownership information for one or more users of an electronic resource is shown. The method 600 may be performed by one of the resource user identification systems of the present disclosure, for example. The method 600 is described below with reference to the resource user identification system 300 but it should be appreciated that other systems and computing devices can also be employed.

The method 600 begins at step 602 in which the user identifier computing device 102 receives a trigger request. The trigger request can be any suitable signal or command that initiates the method 600. In some examples and as previously described with respect to method 400, the trigger request may be received from a manual request by an operator or an automatically generated request. Example automatic trigger requests may be generated when a bandwidth or other usage level of an electronic request passes a threshold level, changes by a predetermined amount, a surge is detected, a predetermined amount of time since the last request has passed, or other event has occurred.

The method 600 may then proceed to step 604. At step 604, the user identifier computing device 102 may obtain first resource usage data and first resource identity data. The first resource usage data may contain the information previously described such as a usage level of the first resource. The first resource identity data may contain information that identifies a user that is associated with the usage of the first resource, such as IP address, for example. The first resource usage data and/or the first resource identity data may also contain other information such a time and date of the usage. The first resource usage data and the first resource identity data may be obtained by the first resource collection engine 302, in some examples. The user identifier computing device 102 can obtain the information using suitable APIs, scripts or other flows as may be allowed or facilitated by a first resource data manager or by a flow log, dashboard or other tool provided by the service provider that provides the first resource to the user and/or to the user's organization. Thus, the information provided in the first resource usage data and the first resource identity data is limited to the information provided through the service provider's first resource data manager or other tool. The ownership of the users associated with the usage information in the first resource usage data and in the first resource identity data is not available at this stage of method 600.

The method 600 may proceed to step 604 at which the user identifier computing device may obtain second resource usage data and second resource identity data. The second resource usage data and the second resource identity data may be similar to the first resource usage data and the first resource identity data. The second resource usage data and the second resource identity data differs in that the information is obtained from the second resource instead of from the first resource. The first resource and the second resource may be the same type of electronic resource but are provided by different service providers. The second resource usage and the second resource identity data can be obtained using the second resource collection engine 304, for example. The user identifier computing device 102 can obtain the information using suitable APIs, scripts or other flows as may be allowed or facilitated by a second resource data manager or by a flow log, dashboard or other tool provided by the service provider that provides the second resource to the user and/or to the user's organization. The second resource service provider likely offers a different data manager or other tool than the first resource service provider. Like the information obtained from the first resource, the information obtained from the second resource is limited and ownership of each user is not available at this stage of method 600.

While not shown, the information received from the first resource and from the second resource may need to be formatted, truncated, or otherwise modified so that the information and/or data fields from each resource is in a form that can allow the user identifier computing device to compare and/or analyze the information as a whole. If the organization desires to compare or to investigate top users of an electronic resource, such as cloud services, it may be desirable to compare usages across all service providers. For this reason, the data from each service provider can be modified to allow such comparison, sorting or other analysis.

The method 600 can proceed to step 608. At step 608, the user identifier computing device 102 may select one or more users of interest. The user identifier computing device 102 may select the users of interest for many different reasons or for different goals. The users may be selected to determine top users of an electronic resource. In other examples, the users may be selected to determine users that influenced or caused a spike or surge in usage. In still other examples, users may be selected based on usages that exceed predetermined thresholds. In yet other examples, users may be selected based on disruptions to business processes. The user identifier computing device 102 may select the one or more users of interests by analyzing, comparing, sorting, filtering or otherwise based on the resource usage data and the resource identity data from the first resource and/or from the second resource. In one example, top users are selected by sorting users by usage at a particular time or in association with a particular event.

In order for the organization to take further action and/or to further investigate its usage of the electronic services, the organization may desire to understand the ownership of the users identified at step 608. For this reason, the method may proceed to step 610 at which the user identifier computing device 102 may determine ownership of the one or more users of interest. In some examples, the ownership engine 306 may be used to determine the ownership of the users of interest. The user identifier computing device 102 may, for example, perform the method 550 for determining ownership of the users of interest. In other examples, other suitable methods such as searching, data mining or other processes can be used.

The method 600 may continue to step 612. At step 612, the ownership information for the one or more users of interest may be published. The information can be published using any suitable method or via any suitable format such as those previously described for methods 550 and method 400. In some examples, the ownership information for the users of interest can be displayed to an operator via a graphical user interface, dashboard, or other tool. In other examples, the users of interest and their ownership information can be published via a report that can be emailed, texted or otherwise communicated to interested parties in the organization.

Although the methods described above are with reference to the illustrated flowcharts and figures, it will be appreciated that many other ways of performing the acts associated with the methods can be used. For example, the order of some operations may be changed, and some of the operations described may be optional.

In addition, the methods and systems described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning and/or artificial intelligence. Machine learning may involve training a mathematical model in a supervised or unsupervised setting. Machine learning models may be trained to learn relationships between various groups of data. The models may be based on a set of algorithms that are designed to model abstractions in data by using a number of processing layers. The processing layers may be made up of non-linear transformations. Machine learning models may include, for example, neural networks, convolutional neural networks and deep neural networks. Such neural networks may be made of up of levels of trainable filters, transformations, projections, hashing, and pooling. The models may be used in large-scale relationship-recognition tasks. The models can be created by using various open-source and proprietary machine learning tools and/or libraries known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
at least one computing device configured to:
receive a trigger request;
obtain first resource usage data and first resource identity data from a first resource provider using a first resource collection engine, the first resource usage data and corresponding first resource identity data characterizing users of a first resource;
obtain second resource usage data and second resource identity data from a second resource provider using a second resource collection engine, the second resource usage data and corresponding second resource identity data characterizing users of a second resource;
select one or more users of interest based on the first resource usage data, the first resource identity data, the second resource usage data and the second resource identity data;
determine ownership of the selected one or more users of interest; and
publish ownership of the selected one or more users of interest.

2. The system of claim 1, wherein the trigger request is automatically generated when the first resource data or the second resource data indicates that usage of the first resource or the second resource is greater than a predetermined usage level.

3. The system of claim 1, wherein the first resource collection engine is configured to obtain the first resource usage data and the first resource identity data from a first resource data manager and the second resource collection engine is configured to obtain the second resource usage data and the second resource identity data from a second resource data manager, the first resource data manager and the second resource data manager being different.

4. The system of claim 3, wherein the first resource is first cloud services provider and the second resource is a second cloud services provider.

5. The system of claim 1, wherein the first resource usage data comprises bandwidth data describing an amount of bandwidth consumed by one or more users and the first resource identity data comprises an internet protocol (IP) address associated with the one or more users.

6. The system of claim 5, wherein the first resource collection engine and the second resource collection engine do not obtain ownership data that characterizes an ownership related to IP addresses in the first resource identity data or in the second resource identity data.

7. The system of claim 1, wherein the one or more users of interest are selected by sorting a usage of the first resource and the second resource for each user and selecting users with the greatest usage levels of the first resource and the second resource.

8. A method comprising:
receiving a trigger request;
obtaining first resource usage data and first resource identity data from a first resource provider using a first resource collection engine, the first resource usage data and corresponding first resource identity data characterizing users of a first resource;

obtaining second resource usage data and second resource identity data from a second resource provider using a second resource collection engine, the second resource usage data and corresponding second resource identity data characterizing users of a second resource;

selecting one or more users of interest based on the first resource usage data, the first resource identity data, the second resource usage data and the second resource identity data;

determining ownership of the selected one or more users of interest; and publishing ownership of the selected one or more users of interest.

9. The method of claim 8, wherein the trigger request is automatically generated when the first resource data or the second resource data indicates that usage of the first resource or the second resource is greater than a predetermined usage level.

10. The method of claim 8, wherein the first resource collection engine is configured to obtain the first resource usage data and the first resource identity data from a first resource data manager and the second resource collection engine is configured to obtain the second resource usage data and the second resource identity data from a second resource data manager, the first resource data manager and the second resource data manager being different.

11. The method of claim 10, wherein the first resource is first cloud services provider and the second resource is a second cloud services provider.

12. The method of claim 8, wherein the first resource usage data comprises bandwidth data describing an amount of bandwidth consumed by one or more users and the first resource identity data comprises an internet protocol (IP) address associated with the one or more users.

13. The method of claim 12, wherein the first resource collection engine and the second resource collection engine do not obtain ownership data that characterizes an ownership related to IP addresses in the first resource identity data or in the second resource identity data.

14. The method of claim 8, wherein the one or more users of interest are selected by sorting a usage of the first resource and the second resource for each user and selecting users with the greatest usage levels of the first resource and the second resource.

15. A non-transitory computer readable medium having instructions stored thereon, wherein the instructions, when executed by at least one processor, cause a device to perform operations comprising:

receiving a trigger request;

obtaining first resource usage data and first resource identity data from a first resource provider using a first resource collection engine, the first resource usage data and corresponding first resource identity data characterizing users of a first resource;

obtaining second resource usage data and second resource identity data from a second resource provider using a second resource collection engine, the second resource usage data and corresponding second resource identity data characterizing users of a second resource;

selecting one or more users of interest based on the first resource usage data, the first resource identity data, the second resource usage data and the second resource identity data;

determining ownership of the selected one or more users of interest; and publishing ownership of the selected one or more users of interest.

16. The non-transitory computer readable medium of claim 15, wherein the trigger request is automatically generated when the first resource data or the second resource data indicates that usage of the first resource or the second resource is greater than a predetermined usage level.

17. The non-transitory computer readable medium of claim 15, wherein the first resource collection engine is configured to obtain the first resource usage data and the first resource identity data from a first resource data manager and the second resource collection engine is configured to obtain the second resource usage data and the second resource identity data from a second resource data manager, the first resource data manager and the second resource data manager being different and the first resource is first cloud services provider and the second resource is a second cloud services provider.

18. The non-transitory computer readable medium of claim 15, wherein the first resource usage data comprises bandwidth data describing an amount of bandwidth consumed by one or more users and the first resource identity data comprises an internet protocol (IP) address associated with the one or more users.

19. The non-transitory computer readable medium of claim 18, wherein the first resource collection engine and the second resource collection engine do not obtain ownership data that characterizes an ownership related to IP addresses in the first resource identity data or in the second resource identity data.

20. The non-transitory computer readable medium of claim 15, wherein the one or more users of interest are selected by sorting a usage of the first resource and the second resource for each user and selecting users with the greatest usage levels of the first resource and the second resource.

* * * * *